United States Patent
Kelly

(10) Patent No.: US 11,168,836 B2
(45) Date of Patent: Nov. 9, 2021

(54) MODULAR CLIPPING DEVICE

(71) Applicant: Phillip Earl Kelly, Rancho Santa Fe, CA (US)

(72) Inventor: Phillip Earl Kelly, Rancho Santa Fe, CA (US)

(*) Notice: Subject to any disclaimer, the term of this patent is extended or adjusted under 35 U.S.C. 154(b) by 0 days.

(21) Appl. No.: 16/989,571

(22) Filed: Aug. 10, 2020

(65) Prior Publication Data

US 2021/0041060 A1 Feb. 11, 2021

Related U.S. Application Data

(60) Provisional application No. 62/884,913, filed on Aug. 9, 2019.

(51) Int. Cl.
*F16M 13/02* (2006.01)
*F16B 2/22* (2006.01)

(52) U.S. Cl.
CPC ............. *F16M 13/022* (2013.01); *F16B 2/22* (2013.01)

(58) Field of Classification Search
CPC combination set(s) only.
See application file for complete search history.

(56) References Cited

U.S. PATENT DOCUMENTS

| | | | | |
|---|---|---|---|---|
| 3,747,166 A * | 7/1973 | Eross | ........................ | F16L 3/24 248/75 |
| 4,688,961 A * | 8/1987 | Shioda | .................... | F16L 3/222 403/389 |
| 4,817,897 A * | 4/1989 | Kreusel | .................... | E04B 1/585 248/68.1 |
| 5,542,159 A * | 8/1996 | Schultz | .................. | A47C 1/124 24/341 |
| 5,687,458 A * | 11/1997 | Coker | ........................ | A45F 5/02 24/336 |
| 5,697,129 A * | 12/1997 | Newville | .................. | B25F 1/02 24/339 |
| 5,772,166 A * | 6/1998 | Adams | .................... | F21V 21/08 248/229.16 |
| 7,241,071 B2 * | 7/2007 | Carraher | .................. | E04C 5/163 403/164 |
| 8,083,432 B2 * | 12/2011 | Limpert | .................. | F16L 3/237 403/389 |
| 8,960,613 B2 * | 2/2015 | White | ..................... | A63B 31/00 248/74.1 |
| 9,194,538 B2 * | 11/2015 | Bulka | ..................... | F16M 11/06 |
| 10,159,783 B2 * | 12/2018 | Kluttz | .................. | A61M 5/1415 |

(Continued)

*Primary Examiner* — Monica E Millner

(57) ABSTRACT

A modular clipping device is used to attach a cylindrical device to a railing structure. The clipping device is formed from two detachable clasps that enable a user to form a semi-permanent mount for the cylindrical device. The clipping device has a pair of mounting brackets and a coupling mechanism. The pair of mounting brackets are clasps that are each designed to clamp around the cylindrical object and the railing structure. The coupling mechanism is a detachable fastener that has a pair of interlocking members which can be quickly connected to or detached from each other. Additionally, each of the interlocking members is connected to a corresponding mounting bracket so that the mounting brackets can be detachably connected to each other. The interlocking members are connected in between the mounting brackets and retain the mounting brackets in a desired orientation.

17 Claims, 6 Drawing Sheets

(56) References Cited

U.S. PATENT DOCUMENTS

| | | | |
|---|---|---|---|
| 10,264,736 B2* | 4/2019 | Rider ...................... | A01G 9/128 |
| 10,648,494 B1* | 5/2020 | Muhammad .............. | A47C 4/48 |
| 2005/0098695 A1* | 5/2005 | Hollenbeck .......... | A61H 3/0244 |
| | | | 248/229.26 |

* cited by examiner

MODULAR CLIPPING DEVICE

The current application claims a priority to the U.S. Provisional Patent application Ser. No. 62/884,913 filed on Aug. 9, 2019.

FIELD OF THE INVENTION

The present invention relates generally to clipping devices. More specifically, the present invention is a double-ended clipping device with detachable ends.

BACKGROUND OF THE INVENTION

Currently, in present society, individuals can have difficulty in mounting items to a railing structure, especially items of a cylindrical shape. Normally, an individual can try to lean the cylindrical-shaped item against the railing structure; however, depending on the circumstances, the cylindrical-shaped item can lose its stability against the railing structure and end up falling to the floor. In order to secure such items to such structures, individuals often utilize a mount that needs to be affixed to the railing structure by means of mechanical fasteners, which can be cumbersome for users to install, adjust, and remove.

An objective of the present invention is to provide users with a device that can be a modular, doubled-ended clipping device. The present invention intends to provide users with a device that can be mounted onto a railing structure from one end, while being mountable to a cylindrical-shaped object from the other end in order to support the cylindrical-shaped object against the railing structure. The present invention intends to provide user with a device that can be versatile in what kinds or types of items the device can support against the railing structure. The present invent intends to provide users with a device that allow a user to temporarily mount the device while the device is needed without the need to utilize mechanical fasteners.

DETAIL DESCRIPTIONS OF THE INVENTION

Figure 1:
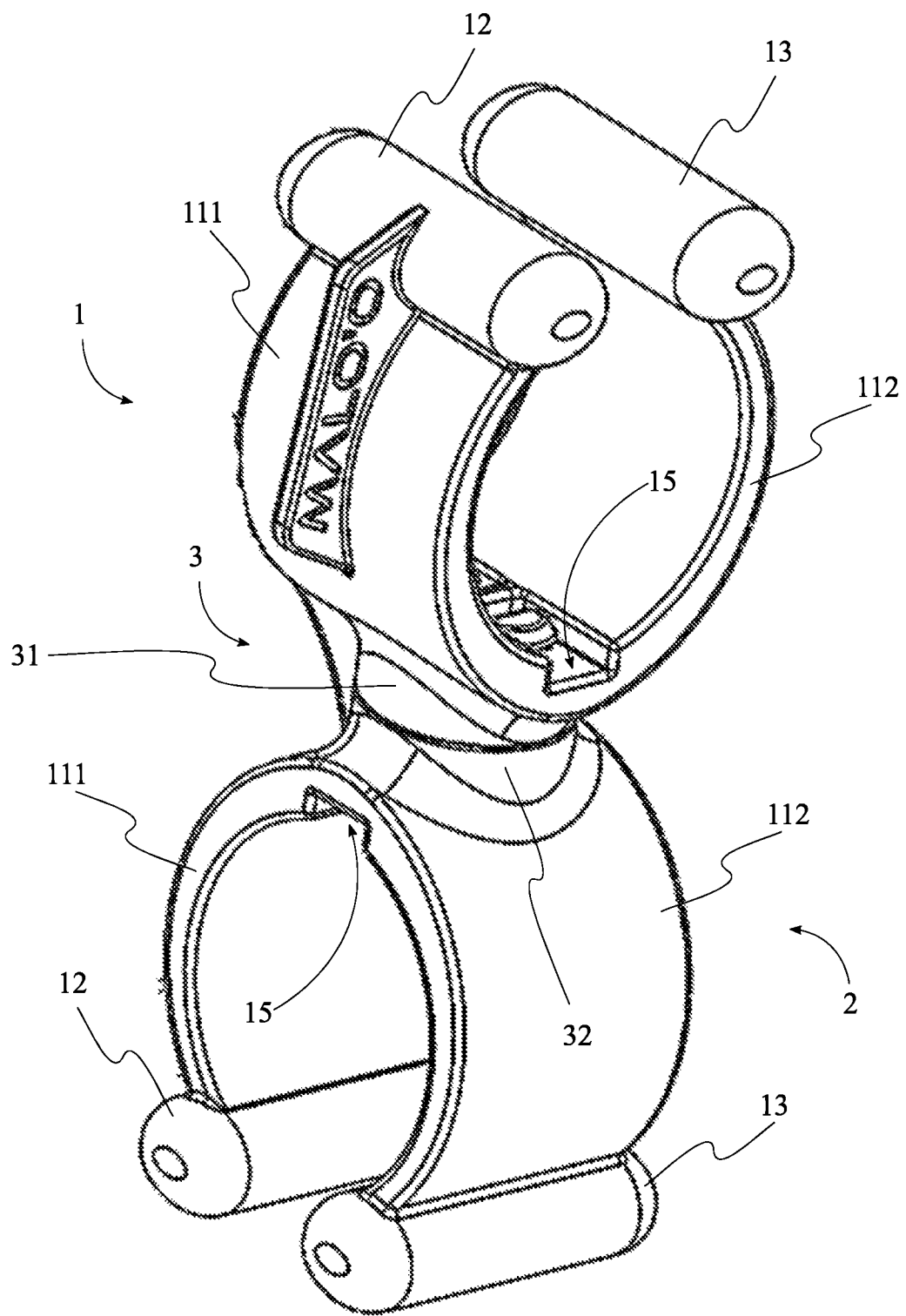
FIG. 1 is a perspective view of the present invention.

All illustrations of the drawings are for the purpose of describing selected versions of the present invention and are not intended to limit the scope of the present invention.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subjected matter disclosed under the header.

Other technical advantages may become readily apparent to one of ordinary skill in the art after review of the following figures and description. It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below.

Unless otherwise indicated, the drawings are intended to be read together with the specification, and are to be considered a portion of the entire written description of this invention. As used in the following description, the terms "horizontal", "vertical", "left", "right", "up", "down" and the like, as well as adjectival and adverbial derivatives thereof (e.g., "horizontally", "rightwardly", "upwardly", "radially", etc.), simply refer to the orientation of the illustrated structure as the particular drawing figure faces the reader. Similarly, the terms "inwardly," "outwardly" and "radially" generally refer to the orientation of a surface relative to its axis of elongation, or axis of rotation, as appropriate. As used herein, the term "dorsal" refers to positions that are located near, on, or towards the upper or top side of a structure.

The present disclosure includes many aspects and features. Moreover, while many aspects and features relate to, and are described in the context of detection of presence of one or more intruder devices, embodiments of the present disclosure are not limited to use only in this context.

Referring to FIG. 1 through FIG. 6, the present invention is a modular clipping device that functions as a multicomponent mounting system which enables a user to detachably mount a desired object onto a cylindrical railing or pipe. The present invention is designed to facilitate the formation of a semi-permanent and reconfigurable mounting point that the user can deploy whenever appropriate. The present invention enables the user to retain a cylindrical object in a desired orientation relative to a cylindrical railing. Thus, the user is able to securely mount devices including, but not limited to, brooms, bikes, and shovels onto a railing structure. To facilitate the above-described functionalities, the present invention comprises a first mounting bracket 1, a second mounting bracket 2, and a coupling mechanism 3. Preferably, the first mounting bracket 1 and the second mounting bracket 2 are identically formed and used as opposing ends of the mounting system. Additionally, the first mounting bracket 1 and the second mounting bracket 2 are preferably C-shaped clasps that secure the cylindrical object in a desired orientation. The coupling mechanism 3 is a detachable connector that enables the first mounting bracket 1 to be repeatedly coupled to and decoupled from the second mounting bracket 2. To facilitate this, the coupling mechanism 3 comprises a first interlocking member 31 and a second interlocking member 32. The first interlocking member 31 and the second interlocking member 32 are fastening devices used to form a reconfigurable connection. The first interlocking member 31 is mounted adjacent to the first mounting bracket 1. Similarly, the second interlocking member 32 is mounted adjacent to the second mounting bracket 2. Thus configured, the first interlocking member 31 is able to engage into the second interlocking member 32 so that the first mounting bracket 1 can be mated to the second mounting bracket 2. Preferably, the first interlocking member 31 retains the second interlocking member 32 in a fixed orientation when the two components are engaged. Thus, the coupling mechanism 3 enables the first mounting bracket 1 and the second mounting bracket 2 to hold the cylindrical object in a desired orientation relative to the railing structure. In some embodiments, the coupling mechanism 3 is a rotating system that enables the first mounting bracket 1 to be rotated relative to the second mounting bracket 2. Further embodiments make use of connector devices selected from the group including, but not limited to, ratcheting mechanisms, hook and loop fasteners, magnets, and screws.

Figure 2:
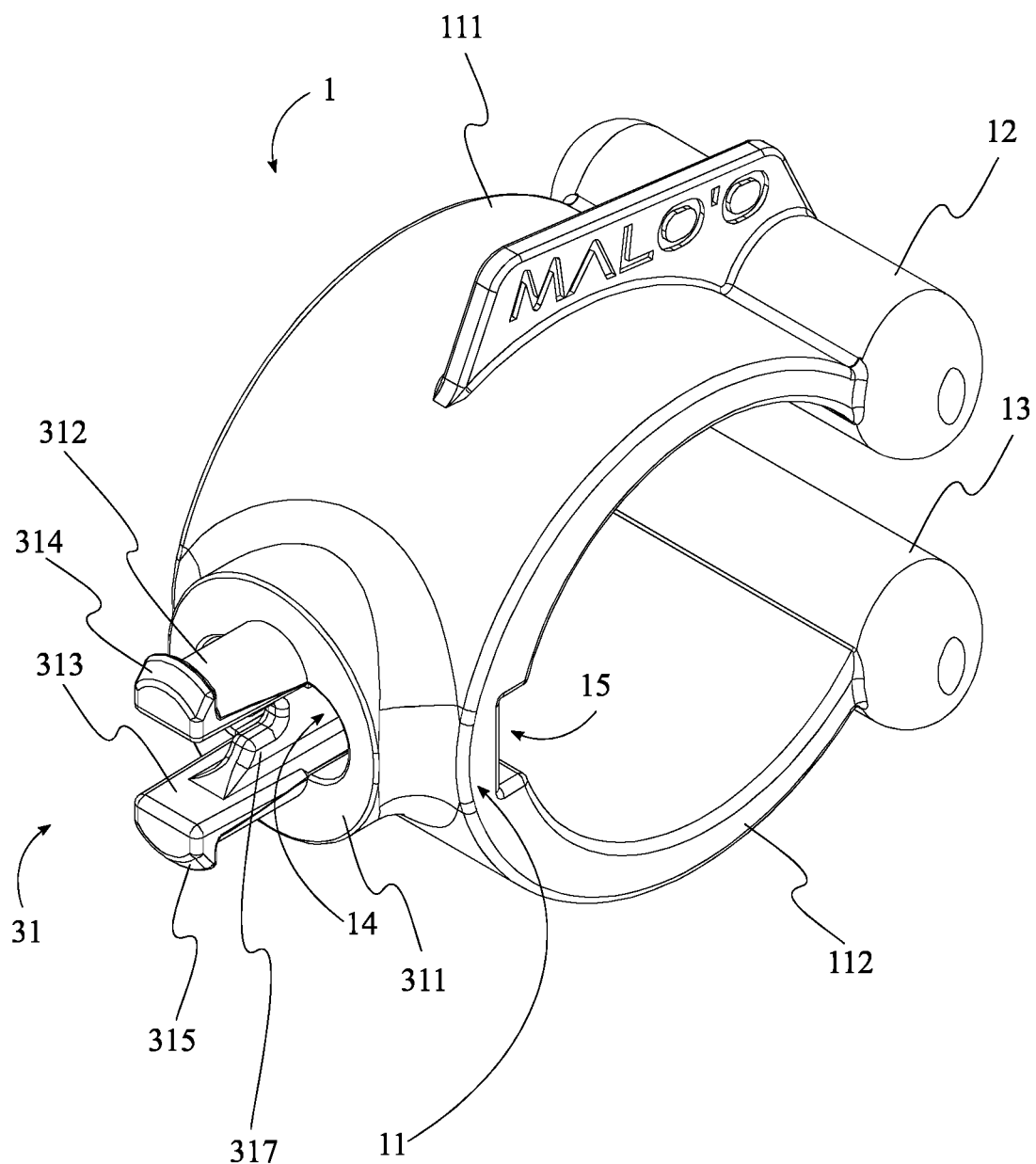
FIG. 2 is a perspective view of the first mounting bracket of the present invention.
Figure 3:
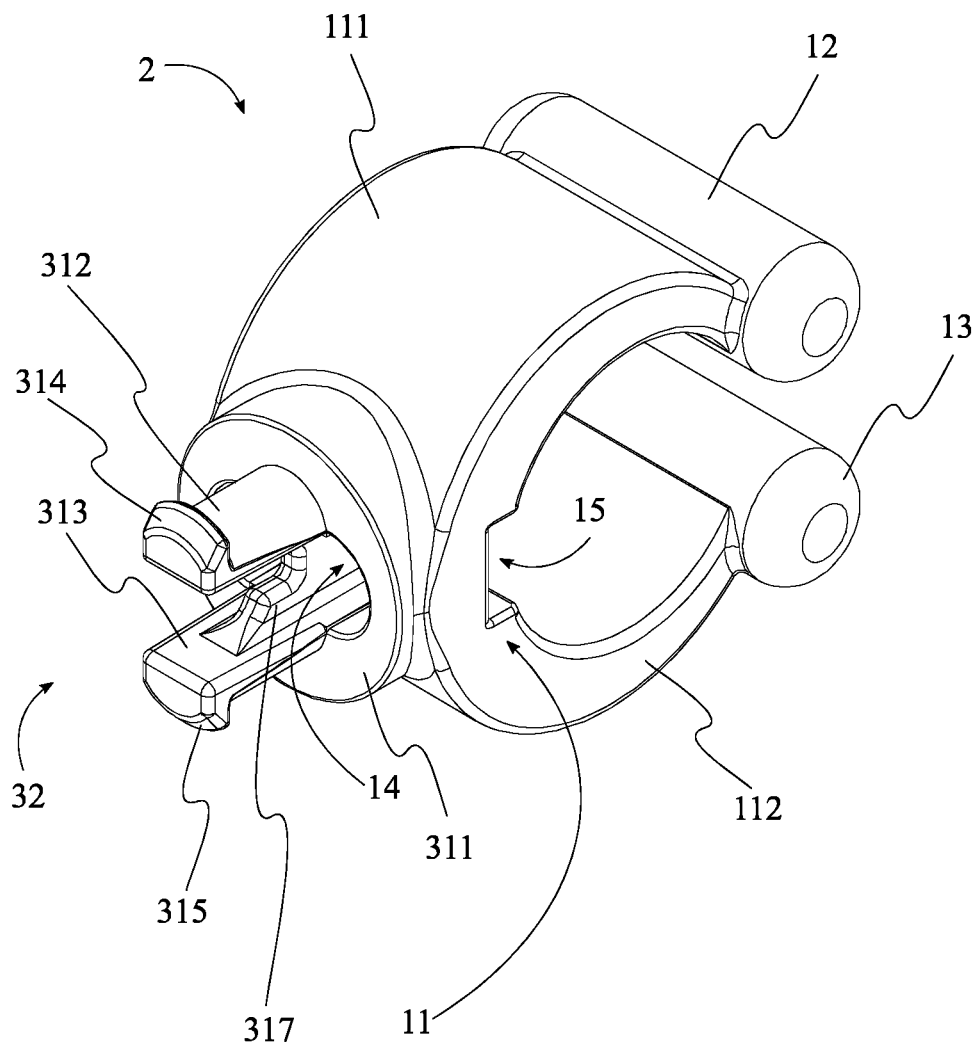
FIG. 3 is a perspective view of the second mounting bracket of the present invention.
Figure 4:
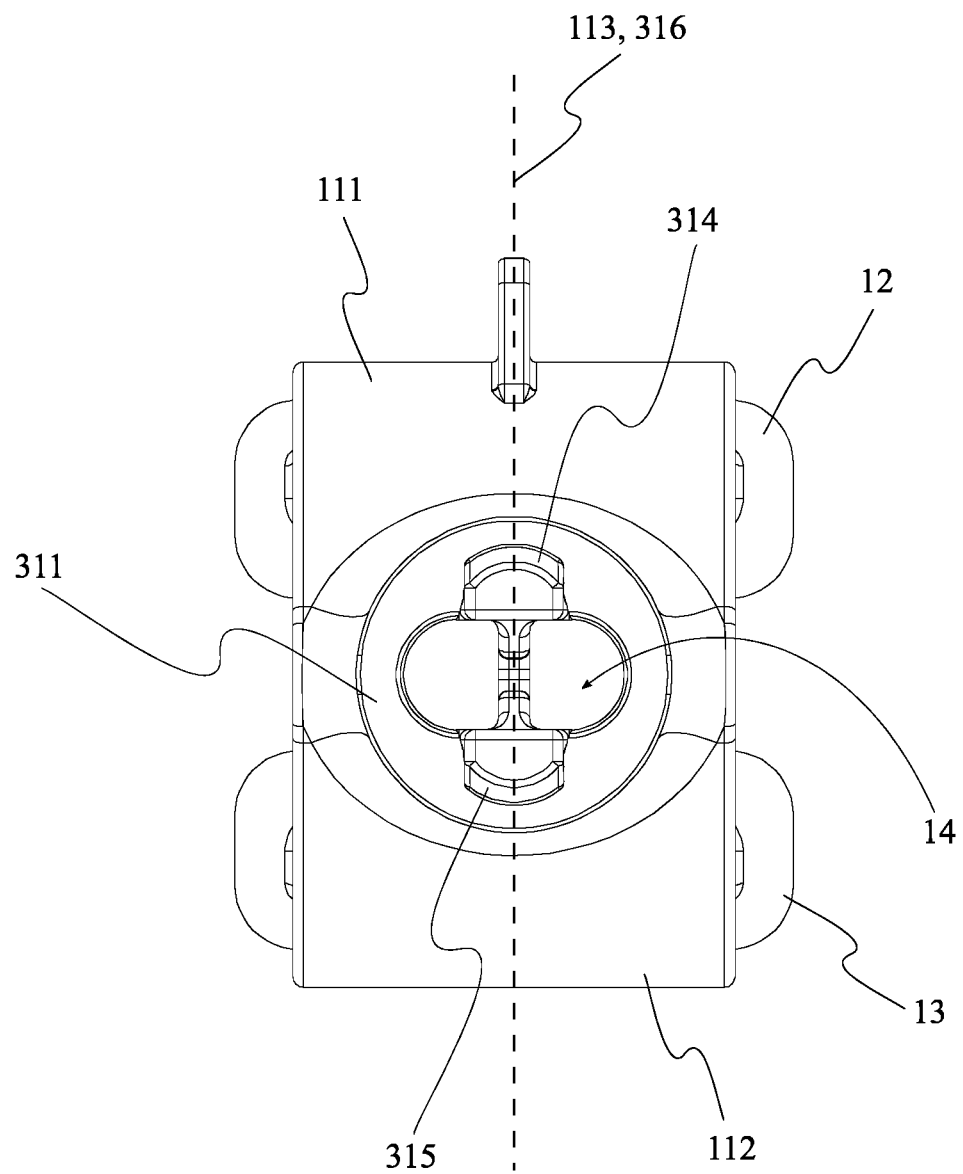
FIG. 4 is a rear view of the first mounting bracket of the present invention.
Figure 5:
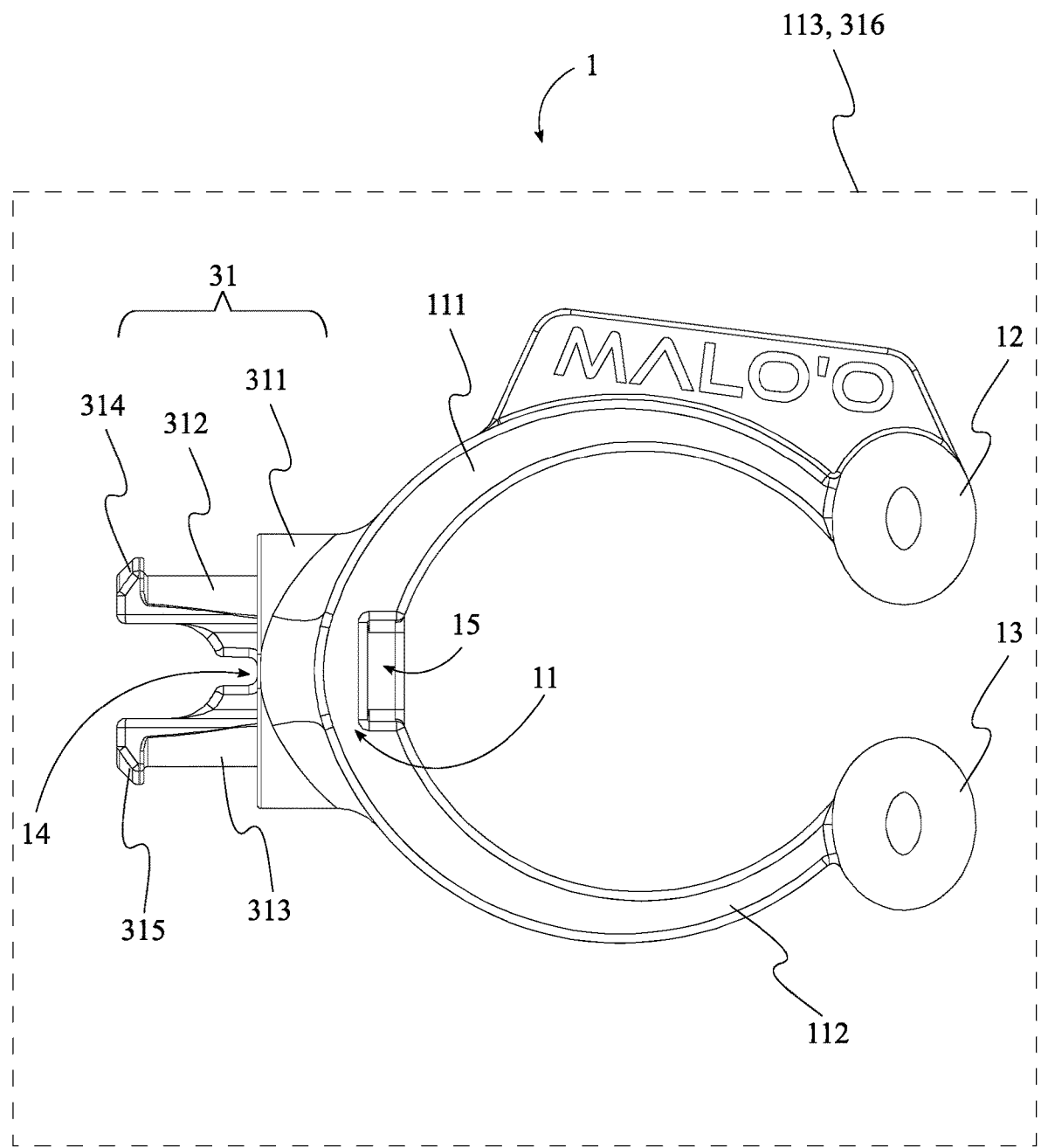
FIG. 5 is a right-side view of the first mounting bracket of the present invention.

Referring to FIG. 1 and FIG. 2, as described above, the present invention makes use of an interlocking system to couple the first mounting bracket 1 to the second mounting bracket 2. To achieve this functionality, the first mounting bracket 1 and the second mounting bracket 2 are C-shaped clips that each comprise a bracket body 11 and a coupler-receiving hole 14. The bracket body 11 is a semirigid structure that defines the overall shape of the first mounting bracket 1 and the second mounting bracket 2. The coupler-receiving hole 14 traverses through the bracket body 11 and is positioned in between a first leg 111 of the bracket body 11 and a second leg 112 of the bracket body 11. Additionally, the first interlocking member 31 is positioned opposite to first leg 111 and the second leg 112 of the first mounting bracket 1, across the bracket body 11 of the first mounting bracket 1. Further, the second interlocking member 32 is positioned opposite to first leg 111 and the second leg 112 of the second mounting bracket 2, across the bracket body 11 of the second mounting bracket 2. Thus, the first interlocking member 31 is able to engage into the coupler-receiving hole 14 of the second mounting bracket 2. This engagement of the first interlocking member 31 occurs concomitant with the second interlocking member 32 engaging into the coupler-receiving hole 14 of the first mounting bracket 1.

Referring to FIG. 1 and FIG. 2, to further facilitate the establishment of a robust connection between the present invention, the cylindrical object, and the railing structure, the first mounting bracket 1 and the second mounting bracket 2 each comprise a first end stopper 12 and a second end stopper 13. Preferably, the first end stopper 12 and the second end stopper 13 are textured cylinders. In some embodiments, the first end stopper 12 and the second end stopper 13 are deformable components that press against lateral surfaces of the railing structure and the cylindrical object. The first end stopper 12 is terminally connected to the first leg 111, opposite to the coupler-receiving hole 14. Likewise, the second end stopper 13 is terminally connected to the second leg 112, opposite to the coupler-receiving hole 14. Thus positioned, the first end stopper 12 and the second end stopper 13 enable the present invention to be securely fastened around the cylindrical object and the railing structure. In some embodiments a fastening strap is detachably connected in between the first end stopper 12 and the second end stopper 13. Thus, the fastening strap further secures the present invention's hold on the cylindrical object and the railing structure.

Figure 6:
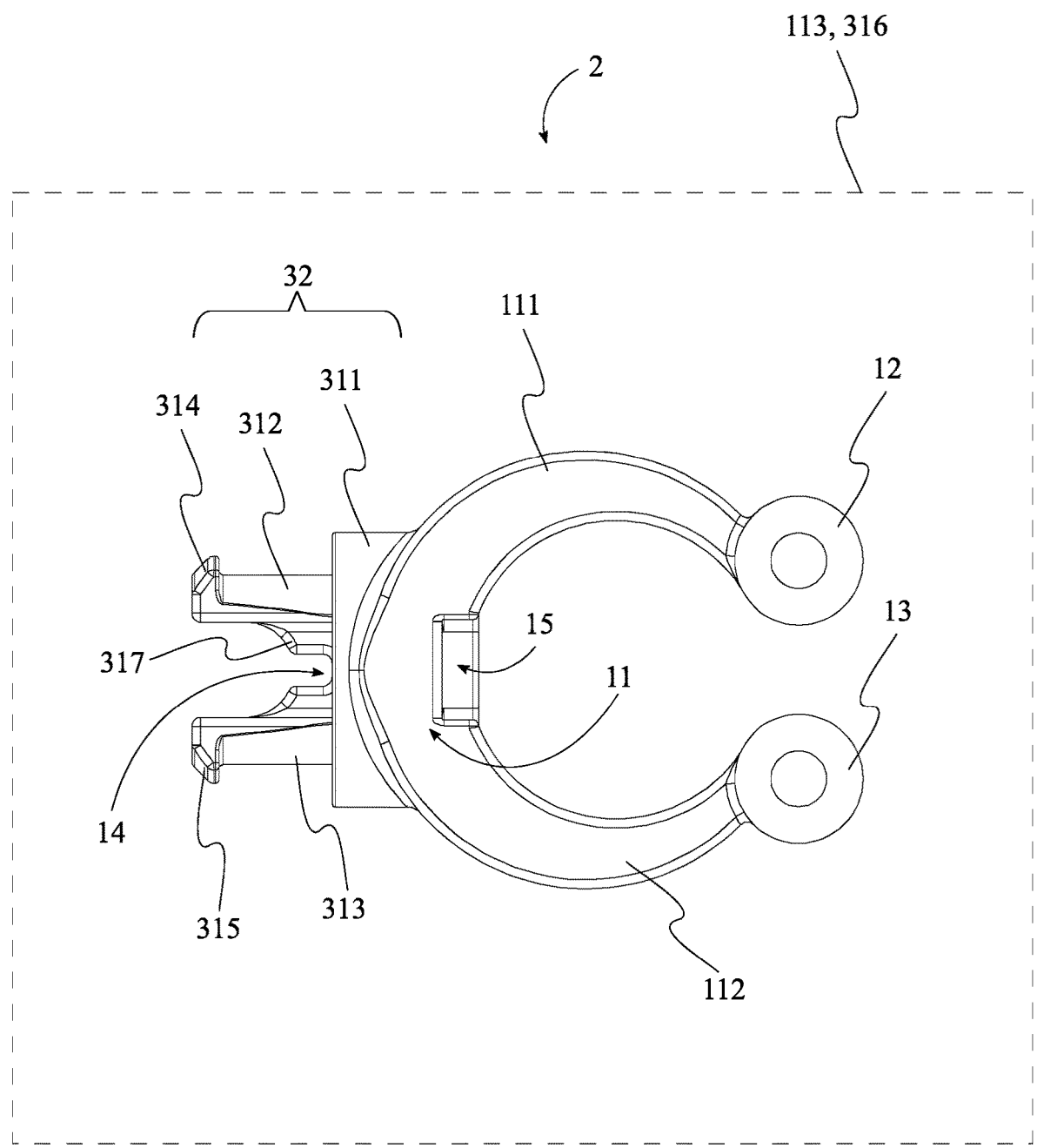
FIG. 6 is a right-side view of the second mounting bracket of the present invention.

Referring to FIG. 1, FIG. 2, and FIG. 6, the present invention is designed to securely connect the first mounting bracket 1 to the second mounting bracket 2. To facilitate this connection, the first mounting bracket 1 and the second mounting bracket 2 each comprise a coupler-fastening groove 15 that traverses into the bracket body 11 and is positioned in between the first leg 111 and the second leg 112. Thus, forming a mounting shoulder to maintain the first interlocking member 31 while engaged into the coupler-receiving hole 14 of the second mounting bracket 2. Similarly, the coupler-fastening grove of the first mounting bracket 1 maintains the second interlocking member 32 while engaged into the coupler-receiving hole 14 of the first mounting bracket 1. Preferably, the coupler-fastening groove 15 is oriented normal to a transverse plane 113 of the first leg 111 and the second leg 112 so that the transverse plane 113 of the first mounting bracket 1 is maintained in an orientation that is normal to the transverse plane 113 of the second mounting bracket 2. In some embodiments, the transverse plane 113 of the first mounting bracket 1 is angularly offset from the transverse plane 113 of the second mounting bracket 2 such that the two are not normal to each other.

Referring to FIG. 1 through FIG. 6, expounding on the descriptions of the coupling mechanism 3 requires the introduction of several sub-components. Namely, the first interlocking member 31 and the second interlocking member 32 each comprise a spacer base 311, a first mating prong 312, a second mating prong 313 a first mating flange 314, a second mating flange 315, and a separation panel 317. The spacer base 311 is a support structure that enables the first interlocking member 31 and the second interlocking member 32 to be aligned, such that the first mounting bracket 1 can be attached to the second mounting bracket 2. Additionally, the spacer base 311 is mounted adjacent to the bracket body 11. Further, the spacer base 311 is terminally connected to the first mating prong 312 and the second mating prong 313. Moreover, the coupler-receiving hole 14 traverses through the spacer base 311 and the first mating prong 312 is positioned opposite to the second mating prong 313 across the coupler-receiving hole 14. Thus positioned, the first mating prong 312, the second mating prong 313, and the spacer base 311 form a protruding male connector that engages the coupler-receiving hole 14 then the first mounting bracket 1 is attached to the second mounting bracket 2. The first mating flange 314 is terminally connected to the first mating prong 312, opposite to the spacer base 311. Similarly, the second mating flange 315 is terminally connected to the second mating prong 313, opposite to the spacer base 311. Thus positioned, the first mating flange 314 and the second mating flange 315 engage into the coupler-fastening groove 15, when the first mounting bracket 1 is attached to the second mounting bracket 2. This configuration prevents the first mounting bracket 1 from rotating relative to the second mounting bracket 2. Specifically, a transverse plane 316 defined by the first mating prong 312 and the second mating prong 313 of the first interlocking member 31 is oriented normal to a transverse plane 316 defined by the first mating prong 312 and the second mating prong 313 of the second interlocking member 32. The separation panel 317 is connected across the coupler-receiving hole 14 and oriented coplanar with the transverse plane 316 defined by the first mating prong 312 and the second mating prong 313. Thus, the separation panel 317 prevents the first mounting bracket 1 from rotating relative to the second mounting bracket 2, when the first interlocking member 31 is engaged with the second interlocking member 32.

Although the invention has been explained in relation to its preferred embodiment, it is to be understood that many other possible modifications and variations can be made without departing from the spirit and scope of the invention as hereinafter claimed.

What is claimed is:

1. A modular clipping device comprising:
   a first mounting bracket;
   a second mounting bracket;
   a coupling mechanism;
   the coupling mechanism comprising a first interlocking member and a second interlocking member;
   the first interlocking member being mounted adjacent to the first mounting bracket;
   the second interlocking member being mounted adjacent to the second mounting bracket;
   the first interlocking member engaging into the second interlocking member;
   the first mounting bracket and the second mounting bracket each comprising a bracket body and a coupler-receiving hole;
   the coupler-receiving hole traversing through the bracket body;
   the coupler-receiving hole being positioned in between a first leg of the bracket body and a second leg of the bracket body;
   the first mounting bracket and the second mounting bracket each comprising a coupler-fastening groove;
   the coupler-fastening groove traversing into the bracket body; and
   the coupler-fastening groove being positioned in between the first leg and the second leg.

2. The modular clipping device as claimed in claim 1 comprising:
   the first mounting bracket and the second mounting bracket each comprising a first end stopper; and
   the first end stopper being terminally connected to the first leg, opposite to the coupler-receiving hole.

3. The modular clipping device as claimed in claim 1 comprising:
   the first mounting bracket and the second mounting bracket each comprising a second end stopper; and
   the second end stopper being terminally connected to the second leg, opposite to the coupler-receiving hole.

4. The modular clipping device as claimed in claim 2 wherein, the coupler-fastening groove is oriented normal to a transverse plane of the first leg and the second leg.

5. The modular clipping device as claimed in claim 1 comprising:
   the first interlocking member being positioned opposite to first leg and the second leg of the first mounting bracket, across the bracket body of the first mounting bracket.

6. The modular clipping device as claimed in claim 1 comprising:
   the second interlocking member being positioned opposite to first leg and the second leg of the second mounting bracket, across the bracket body of the second mounting bracket.

7. The modular clipping device as claimed in claim 1, wherein the first mounting bracket and the second mounting bracket each is a C-shaped clip.

8. The modular clipping device as claimed in claim 1 comprising:
   the first interlocking member and the second interlocking member each comprising a spacer base, a first mating prong, and a second mating prong;
   the first mounting bracket and the second mounting bracket each comprising a coupler-receiving hole;
   the spacer base being terminally connected to the first mating prong;
   the spacer base being terminally connected to the second mating prong;
   the coupler receiving hole traversing through the spacer base; and
   the first mating prong being positioned opposite to the second mating prong across the coupler-receiving hole.

9. The modular clipping device as claimed in claim 8 comprising:
- the first interlocking member and the second interlocking member each comprising a separation panel;
- the separation panel being connected across the coupler-receiving hole; and
- the separation panel being oriented coplanar with a transverse plane defined by the first mating prong and the second mating prong.

10. The modular clipping device as claimed in claim 8 comprising:
- the first interlocking member and the second interlocking member each comprising a first mating flange, and a second mating flange;
- the first mating flange being terminally connected to the first mating prong, opposite to the spacer base; and
- the second mating flange being terminally connected to the second mating prong, opposite to the spacer base.

11. The modular clipping device as claimed in claim 8, wherein a transverse plane defined by the first mating prong and the second mating prong of the first interlocking member is oriented normal to a transverse plane defined by the first mating prong and the second mating prong of the second interlocking member.

12. A modular clipping device comprising:
- a first mounting bracket;
- a second mounting bracket;
- a coupling mechanism;
- the coupling mechanism comprising a first interlocking member and a second interlocking member;
- the first mounting bracket and the second mounting bracket each comprising a bracket body, a coupler-receiving hole, a first end stopper, and a second end stopper;
- the first interlocking member being mounted adjacent to the first mounting bracket;
- the second interlocking member being mounted adjacent to the second mounting bracket;
- the first interlocking member engaging into the second interlocking member;
- the coupler-receiving hole traversing through the bracket body; and
- the coupler-receiving hole being positioned in between a first leg of the bracket body and a second leg of the bracket body;
- the first end stopper being terminally connected to the first leg, opposite to the coupler-receiving hole;
- the first end stopper being terminally connected to the second leg, opposite to the coupler-receiving hole;
- the first interlocking member being positioned opposite to first leg and the second leg of the first mounting bracket, across the bracket body of the first mounting bracket;
- the second interlocking member being positioned opposite to first leg and the second leg of the second mounting bracket, across the bracket body of the second mounting bracket;
- the first mounting bracket and the second mounting bracket each comprising a coupler-fastening groove;
- the coupler-fastening groove traversing into the bracket body;
- the coupler-fastening groove being positioned in between the first leg and the second leg; and
- the coupler-fastening groove being oriented normal to a transverse plane of the first leg and the second leg.

13. The modular clipping device as claimed in claim 12, wherein the first mounting bracket and the second mounting bracket each is a C-shaped clip.

14. The modular clipping device as claimed in claim 12 comprising:
- the first interlocking member and the second interlocking member each comprising a spacer base, a first mating prong, and a second mating prong;
- the first mounting bracket and the second mounting bracket each comprising a coupler-receiving hole;
- the spacer base being terminally connected to the first mating prong;
- the spacer base being terminally connected to the second mating prong;
- the coupler receiving hole traversing through the spacer base; and
- the first mating prong being positioned opposite to the second mating prong across the coupler-receiving hole.

15. The modular clipping device as claimed in claim 14 comprising:
- the first interlocking member and the second interlocking member each comprising a separation panel;
- the separation panel being connected across the coupler-receiving hole; and
- the separation panel being oriented coplanar with a transverse plane defined by the first mating prong and the second mating prong.

16. The modular clipping device as claimed in claim 14 comprising:
- the first interlocking member and the second interlocking member each comprising a first mating flange, and a second mating flange;
- the first mating flange being terminally connected to the first mating prong, opposite to the spacer base; and
- the second mating flange being terminally connected to the second mating prong, opposite to the spacer base.

17. The modular clipping device as claimed in claim 14, wherein a transverse plane defined by the first mating prong and the second mating prong of the first interlocking member is oriented normal to a transverse plane defined by the first mating prong and the second mating prong of the second interlocking member.

\* \* \* \* \*